US005741616A

United States Patent [19]

Hirano et al.

[11] Patent Number: 5,741,616

[45] Date of Patent: Apr. 21, 1998

[54] METHOD OF DEVELOPING LATENT ELECTROSTATIC IMAGES AND DEVELOPER-BEARING MEMBER

[75] Inventors: Yasuo Hirano; Jun Aoto; Kazuo Nojima, all of Numazu; Koji Suzuki, Yokohama; Hiroshi Takashima, Yono; Shigekazu Enoki; Yuichi Ueno, both of Kawasaki; Naoki Iwata, Tokyo, all of Japan

[73] Assignee: Ricoh Company, Ltd., Tokyo, Japan

[21] Appl. No.: 339,583

[22] Filed: Nov. 14, 1994

Related U.S. Application Data

[63] Continuation of Ser. No. 714,669, Jun. 13, 1991, abandoned.

[30] Foreign Application Priority Data

| | | | |
|---|---|---|---|
| Jun. 14, 1990 | [JP] | Japan | 2-156868 |
| Aug. 1, 1990 | [JP] | Japan | 2-205683 |
| Aug. 1, 1990 | [JP] | Japan | 2-205684 |
| Aug. 1, 1990 | [JP] | Japan | 2-205685 |
| Aug. 1, 1990 | [JP] | Japan | 2-205686 |

[51] Int. Cl.$^{6}$ .............................. G03G 13/06; B32B 5/16

[52] U.S. Cl. .............................. 430/101; 399/286; 492/28; 492/56; 428/331

[58] Field of Search .............................. 430/101; 355/246, 355/259; 118/651, 653, 654; 399/279, 281, 285, 286; 492/28, 37, 56, 53; 428/323, 331

[56] References Cited

U.S. PATENT DOCUMENTS

| | | | |
|---|---|---|---|
| 2,585,219 | 2/1952 | Boyle | 428/323 X |
| 2,675,047 | 4/1954 | Andy | 428/323 X |
| 4,505,573 | 3/1985 | Brewington et al. | 355/3 DD |
| 4,564,285 | 1/1986 | Yasuda et al. | 355/3 DD |
| 4,833,058 | 5/1989 | Hirsno et al. | 430/120 |
| 4,994,319 | 2/1991 | Nojima et al. | 428/335 |
| 5,099,285 | 3/1992 | Hirano et al. | 355/245 |

FOREIGN PATENT DOCUMENTS

| | | | |
|---|---|---|---|
| 61-79697 | 4/1986 | Japan | 492/53 |

*Primary Examiner*—George F. Lesmes
*Assistant Examiner*—Bernard P. Codd
*Attorney, Agent, or Firm*—Cooper & Dunham LLP

[57] ABSTRACT

A method of developing latent electrostatic images and a developer-bearing member for use in the method are disclosed, which method includes the steps of (a) forming numerous micro closed electric fields near the surface of a rotatable developer-bearing member which comprises an electroconductive support and a surface layer formed thereon comprising an electroconductive organic polymeric matrix and numerous minute charge-retainable insulating segments distributed at least one the surface of the surface layer, by electrically charging the surface of the charge-retainable insulating segments; (b) supplying a one-component type developer comprising toner particles to the rotatable developer-bearing member to hold the developer on the rotatable developer-bearing member to hold the developer on the rotatable developer-bearing member by the numerous micro closed electric fields; and (c) bringing the rotatable developer-bearing member near or into contact with a latent-electrostatic-image-bearing member which bears a latent electrostatic image to develop the latent electrostatic image with the one-component developer to a visible toner image.

12 Claims, 2 Drawing Sheets

METHOD OF DEVELOPING LATENT ELECTROSTATIC IMAGES AND DEVELOPER-BEARING MEMBER

This is a continuation of application Ser. No. 714,669, filed Jun. 13, 1991 now abandoned.

BACKGROUND OF THE INVENTION

1. Field of the Invention

The present invention relates to a method of developing latent electrostatic images on a latent-electrostatic-image-bearing member by supplying a non-magnetic one-component type developer to a rotatably driven developer-bearing member, when necessary, with addition of auxiliary agents thereto, thereby transporting the developer onto the surface of the developer-bearing member, and developing the latent electrostatic images which are borne on the latent-electrostatic-image-bearing member by the one-component type developer to visible images in a development zone where the latent-electrostatic-image-bearing member and the rotatably driven developer-bearing member face each other, and a developer-bearing member for use in this development method.

2. Discussion of Background

In conventional image formation apparatus, such as electrophotographic copying machines, printers and facsimile apparatus, dry type development units using a powder-like developer are widely used.

As such powder-like developers, a two-component type developer comprising a toner and a carrier, and a one-component type developer comprising a toner, but without containing a carrier, are conventionally known.

A two-component type development method using the former two-component type developer is capable of yielding relatively stable, good recorded images, but has the shortcomings that the carrier deteriorates, and the mixing ratio of the toner and the carrier tends to change, while in use, so that the maintenance of an apparatus using this method is complicated. Furthermore, the apparatus using the two-component type development method is relatively oversized.

From the above point of view, the primary focus of attention is on a one-component type development method using the one-component type developer, which does not have the above-mentioned shortcoming as in the two-component type development method.

There are two types of one-component type developers. One is of a type which consists of a toner, while the other is of a type which consists of a mixture of a toner, when necessary with addition of an auxiliary agent thereto, and an auxiliary agent.

There are two types of toners. One is a magnetic toner which contains magnetic particles, and the other is a non-magnetic toner which does not contain magnetic particles.

Generally magnetic materials are not transparent. Therefore, even if it is tried to obtain colored images, including full-color images and multi-colored images, by use of a magnetic toner, it is extremely difficult to obtain clear color images. Therefore, it is preferable to employ a one-component type development method which uses a non-magnetic toner when colored images are to be obtained.

In a development unit using the one-component type developer is held on a developer-bearing member and transported into a development zone where a latent-electrostatic-image-bearing member which bears latent electrostatic images, and the developer-bearing member face each other, and the latent electrostatic images are developed to visible images by the one-component type developer held on the developer-bearing member. In such a development unit, however, in order to obtain visible images with high quality and a predetermined image density, it is required that a large amount of a sufficiently charged toner be transported into the above-mentioned development zone.

When a one-component developer consisting of a magnetic toner is employed, the above requirement can be met relatively easily because the one-component developer can be held on a developer-bearing member if an inner magnet is built therein. However, when a non-magnetic one-component developer is employed, it is extremely difficult to meet the above requirement because the developer cannot be magnetically held on the developer-bearing member.

Various proposals have been conventionally made as countermeasures for the above-mentioned problem. For example, Japanese Laid-Open Patent Application 61-42672 proposes a method of transporting a one-component type developer into a development zone by the steps of bringing a developer supply member consisting of, for example, a sponge roller, into pressure contact with a development roller with an insulating (or dielectric) layer thereon, serving as a developer-bearing member, triboelectrically charging the entire surface of the insulating layer of the development roller uniformly, and electrostatically depositing a non-magnetic toner which is charged to a polarity opposite to that of the insulating layer.

In this method, however, it cannot be carried out to sufficiently increase the intensity of an electric field formed on the insulating layer, so that it is difficult to hold a large amount of the toner on the surface of the development roller. Accordingly, the amount of the developer that can be transported into the development zone decreases during the development step. The result is that it is difficult to obtain visible images with high density.

In addition to the above, there is known a development unit with a structure by which an electric field is applied across a development roller and a developer supply member in such a direction that a non-magnetic toner is electrostatically moved toward the development roller. This structure, however, is not capable of depositing a sufficient amount of the developer on the development roller for obtaining images with high quality and high density.

As such toner supply members, there are known an electroconductive foamed member with an electric resistivity of $10^2$–$10^6$ Ω·cm as disclosed in Japanese Laid-Open Patent Application 60-229057, an elastic member with a skin layer as disclosed in Japanese Laid-Open Patent Application 60-229060, and a fur brush as disclosed in Japanese Laid-Open Patent Application 61-42672.

Furthermore, as such development rollers, there are proposed a metallic development roller with an uneven surface as disclosed in Japanese Laid-Open Patent Application 60-53976, a development roller covered with an insulating overcoat layer is disclosed in Japanese Laid-Open Patent Application 55-46768, a development roller with an overcoat layer with a medium electric resistivity as disclosed in Japanese Laid-Open Patent Application 58-13278, and an electrode development roller with an insulating member and an electroconductive surface as disclosed in Japanese Laid-Open Patent Application 53-36245.

In conventional development units using a non-magnetic one-component type developer, a toner is a triboelectrically charged by the friction between the toner and a toner supply member, such as a sponge roller as in Japanese Laid-Open Patent Application 60-229057, an elastic roller as in Japanese Laid-Open Patent Application 62-229060, and a fur brush as in Japanese Laid-Open Patent Application 61-52663, while the surface of a development roller is uniformly triboelectrically charged, so that the toner is electrostatically deposited in the form of a layer on the entire surface of the development roller, with the thickness regulating member such as a blade, whereby latent electrostatic images formed on a photoconductor are developed to visible toner images by the toner. As the materials for the development roller for such conventional development units, for example, insulating materials, materials with a medium electric resistivity and layered materials are employed.

In the development methods disclosed in the above references, the toner is deposited on the development roller by the triboelectric charging between the toner supply member and the development roller. However, the above triboelectric charging is performed between the toner-deposited toner supply member and the toner-deposited development roller, so that sufficient charging cannot be attained. The result is that the deposition of the toner on the development roller becomes insufficient for obtaining toner images with sufficiently high image density.

The optimum deposition amount of a non-magnetic one-component toner and a charge quantity of the other in a development method using a non-magnetic one-component developer will now be explained.

For monochromic copying or black and white copying, the electric charge quantity of the toner is of importance and preferably in the range of 10–20 μC/g. When the charge quantity is less than the above range, toner deposition on the background of the copy tends to occur and the obtained images are poor in sharpness. Furthermore, it is necessary that the toner deposition on the development roller be in the range of 0.1–0.3 $mg/cm^2$, and that the toner deposition on an image transfer sheet be in the range of 0.4–0.5 $mg/cm^2$. This toner deposition on the image transfer sheet is attained by setting the rotation speed of the development roller at 3 to 4 times the speed of a photoconductor on which toner images are formed. When the rotation speed of the development roller is set in the above range with respect to the rotation speed of the photoconductor, there is the problem that a developed solid toner image has a higher density in a rear end portion of the toner image than in the other portion. This phenomenon is referred to as "toner rear end shifting". In order to eliminate this problem, the rotation speed of the development roller has to be set as close as possible to that of the photoconductor. In order to obtain high quality images by this setting of the rotation speed of the development roller, the deposition amount of the toner on the development roller must be increased and the number of revolutions must be decreased.

On the other hand, in the case of color toners, with respect to the color characteristics thereof, the colored degree is smaller than that of black toners. Furthermore, in order to make an improvement with respect to the "toner rear end shifting", it is necessary that the toner be deposited on the development roller in an amount of 0.8–1.2 $mg/cm^2$, and in order to obtain stable toner images, the charge quantity of the toner be in the range of 5–20 μC/g, preferably in the range of 10–15 μC/g.

In order to solve these conventional problems, the inventors of the present invention proposed in U.S. patent application Ser. No. 597881 filed on Oct. 12, 1990 now abandoned a development method of developing latent electrostatic images to visible images. In this development method, one-component component type developer comprising a non-magnetic toner, when necessary, with addition of an auxiliary agent, is supplied to a rotatably driven developer-bearing member, so that the developer-bearing member is caused to hold the developer thereon. The developer is transported onto the latent electrostatic images on a latent-electrostatic-image bearing member to develop visible toner images in a development zone where the developer-bearing member and the latent-electrostatic-image-bearing member face each other. In this development method, the surface of the developer-bearing member is electrically charged in such a manner that a number of micro closed electric fields are formed near the surface of the developer-bearing member, so that charged toner particles are attracted to the developer-bearing member by the micro closed electric fields, whereby latent electrostatic images are developed to visible toner images.

In this development method, a number of micro closed fields are formed near the surface of the developer-bearing member, so that the intensity of the overall electric field near the surface of the developer-bearing member can be considerably increased in comparison with in the conventional development methods. Thus, this development method has the advantage over the conventional development methods that a large amount of charged toner can be held on a development roller and transported in the development zone.

Furthermore, the inventors of the present invention proposed a developer-bearing member comprising a conductive base and a plurality of kinds of substances, each having a particular charging characteristic and being exposed to the outside on the surface of the conductive base in a predetermined pattern.

SUMMARY OF THE INVENTION

It is therefore an object of the present invention to provide a method of developing latent electrostatic images to visible images, capable of yielding images with high quality and with uniform density by bringing a developer-bearing-member into contact with a latent-electrostatic-image-bearing member in a development zone, without the necessity for the means for maintaining the gap between the surface of the developer-bearing member and the surface of the latent-electrostatic-image-bearing member at a predetermined value.

Another object of the present invention is to provide a developer-bearing member for use in the above method of developing latent electrostatic images.

The first object of the present invention is attained by a method of developing latent electrostatic images comprising the steps of (a) forming numerous micro closed electric fields near the surface of a rotatable developer-bearing member which comprises an electroconductive support and a surface layer formed thereon comprising an electroconductive organic polymeric matrix and numerous minute charge-retainable insulating segments distributed at least on the surface of the surface layer, by electrically charging the surface of the charge-retainable insulating segments; (b) supplying a one-component type developer comprising tone particles to the rotatable developer-bearing member to hold the developer on the rotatable developer-bearing member by the numerous micro closed electric fields; and (c) bringing the rotatable developer-bearing member near or into contact with a latent-electrostatic-image-bearing member which bears a latent electrostatic image to develop the latent electrostatic image with the one-component developer to a visible toner image.

The second object of the present invention is attained by a rotatable developer-bearing member which comprises an electroconductive support and a surface layer formed thereon comprising an electroconductive organic polymeric matrix and numerous minute charge-retainable insulating segments distributed at least on the surface of the surface layer, in which the surface layer comprises the electroconductive organic polymeric matrix and insulating particles dispersed in the electroconductive organic polymeric matrix, and of the insulating particles, those exposed on the surface of the surface layer constitute the insulating segments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
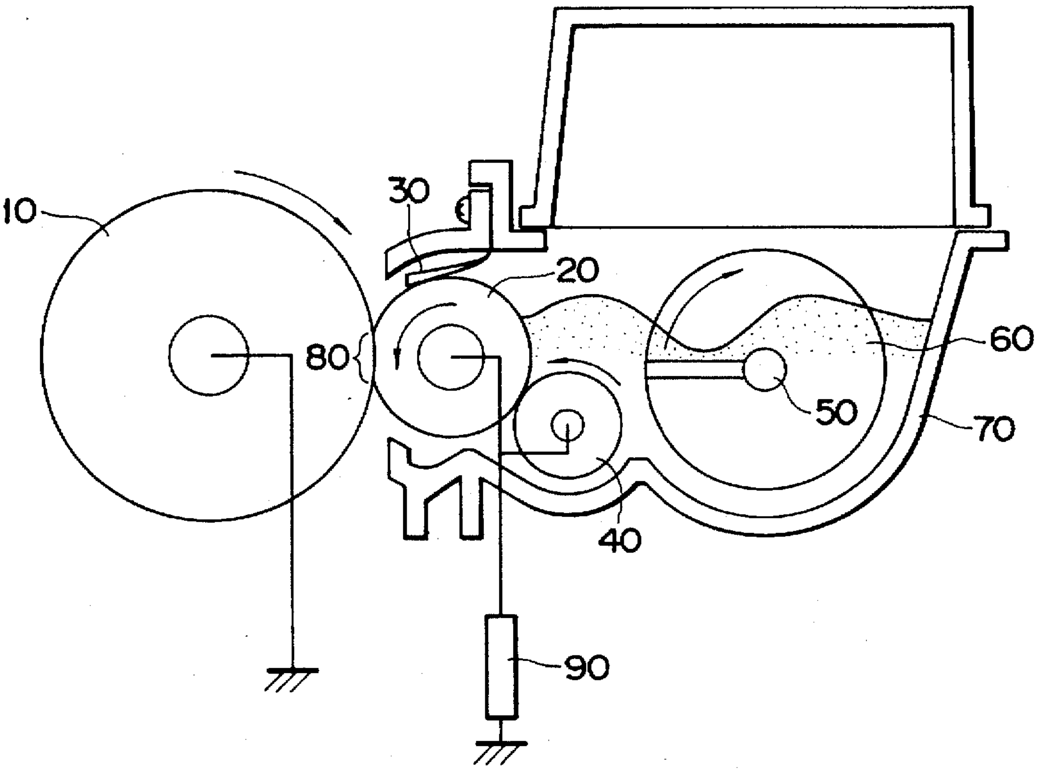
FIG. 1 is a schematic cross-sectional view of a development unit including a developer-bearing member with micro closed electric fields formed thereon according to the present invention.

In the method of developing latent electrostatic images according to the present invention, a number of micro closed electric fields are formed near the surface of a developer-bearing member, so that the overall intensity of the electric fields formed near the developer-bearing member is much greater than that formed near the conventional developer-bearing members.

Furthermore, according to the present invention, the developer-bearing member comprises an electroconductive support and a surface layer formed thereon comprising an electroconductive organic polymeric matrix and numerous minute charge-retainable insulating segments distributed at least on the surface of the surface layer, in which the surface layer comprises the electroconductive organic polymeric matrix and insulating particles dispersed in the electroconductive organic polymeric matrix. By this structure, stable toner deposition and stable charging of toner particles can be attained. The developer-bearing member according to the present invention can be fabricated easily and inexpensively.

As mentioned above, the developer-bearing member according to the present invention comprises an electroconductive support and a surface layer formed thereon comprising an electroconductive organic polymeric matrix and insulating particles dispersed therein.

The electroconductive organic polymeric matrix for use in the present invention is generally made of a material having an electric resistivity of $10^{12}$ Ω·cm or less. It is preferable that the material have an electric resistivity of $10^{8}$ Ω·cm or less. It is more preferable that the material have an electric resistivity of $10^{8}$ Ω·cm or less under the conditions of 10° C., 15%RH. This is because such a material has the function of enhancing the intensity of an electric field formed between the material and the insulating particles, and is stable under ambient conditions such as high temperature and high humidity, and lower temperature and low humidity. Furthermore, such a material also works as an electrode during the development process.

Furthermore, when a material having an electric resistivity of $10^{12}$ Ω·cm or less, preferably $10^{10}$ Ω·cm or less, under the ambient conditions of 10° C. 15%RH, and an electric resistivity of $10^{8}$ Ω·cm or more, under the ambient conditions of 30° C., 80%RH, is employed for the electroconductive organic polymeric matrix, excellent gamma at the time of development, and excellent reproduction of half-tone images can be obtained, and when a bias voltage is applied to the developer-bearing member, it is effective for preventing the leakage of electric current.

Examples of the electroconductive organic polymeric matrix for use in the present invention are organic polymers with addition of an electroconductivity-imparting agent.

Examples of the organic polymers are resinous materials (plastomers) and rubber materials (elastomers).

Examples of the plastomers include vinyl resins such as polyvinyl chloride, polyvinyl butyral, polyvinyl alcohol, polyvinylidene chloride, polyvinyl acetate, and polyvinylformal; polystyrene resins such as polystyrene, styrene-acrylonitrile copolymer, and acrylonitrile-butadiene-styrene copolymer; polyethylene resins such as polyethylene, and ethylene-vinyl acetate copolymer; acrylic resins such as polymethylmethacrylate, and polymethylmethacrylate-styrene copolymer; and other resins such as polyacetal, polyamide, cellulose, polycarbonate, phenoxy resin, polyester, fluorine plastics, polyurethane, phenolic resin, urea resin, melamine resin, epoxy resin, unsaturated polyester resin, and silicone resin.

Examples of the elastomers include diene rubbers such as styrene-butadiene rubber (SBR), butadiene rubber (BR), isoprene rubber (IR), nitrile-butadiene rubber (NBR), nitrile-isoprene rubber (NIR), and chloroprene rubber (CR); olefin rubbers such as butyl rubber (IIR), ethylene-propylene rubber (EPM, EPDM), and chlorosulfonated polyethylene (CSM); ether rubbers such as epichlorohydrin rubber (CHR, CHC); and other elastomers as silicone rubber, fluororubber, acrylic rubber, urethane rubber, and styrene-, olefin-, polyvinyl-chloride-, urethane-, polyester-, polyamide-, fluoro-, and polyethylene-chloride-thermoplastic elastomers.

Examples of the electroconductivity-imparting agent for use in the electroconductive organic polymeric matrix include pulverised metals such as Ni and Cu; carbon blacks such as furnace black, lamp black, thermal black, acetylene black, channel black; electroconductive oxides such as tin oxide, zinc oxide, molybdenum oxide, antimony oxide, potassium titanate; titanium oxide, and electroless=plated mica; and inorganic fillers and surfactants such as graphite, metallic fibers and carbon fiber.

In addition to the above, organic ionic conductors comprising (i) a polymer matrix made of, for example, polyethylene oxide or polysiloxane, and (ii) a metallic ion which is coordinated with such a polymer matrix, can also be used as the electroconductivity-imparting agent.

When any of the above elastomers is employed in the electroconductive organic polymeric matrix, the surface layer of the developer-bearing member is elastic, so that a rigid photoconductor, for example, a photoconductor comprising an metallic drum and a photoconductive layer formed thereon, can be easily brought into close contact with the surface layer of the developer-bearing member. The result is that contact development can be easily carried out. For this reason, it is preferable that any of the above-mentioned elastomers be employed in the surface layer of the developer-bearing member.

In the present invention, insulating particles having an electric resistivity of $10^{13}$ Ω·cm or more, preferably $10^{14}$ Ω·cm or more, with a specific inductive capacity of 4 or less, are employed as the insulating particles to be dispersed in the electroconductive organic polymeric matrix in the surface layer of the developer-bearing member. It is also preferable that the average particle diameter of the insulating particles by 10 μm or more, more preferably 30 to 500 μm, in order to form micro closed electric fields and to attain stable toner deposition on the developer-bearing member and stable electric charging of toner particles.

Specific examples of such insulating particles for use in the present invention include particles of inorganic materials such as alumina, beryllia, magnesia, silicon nitride, boron nitride, mullite, steatite, forsterite, and zircon; and particles of organic materials such a epoxy resin, fluoroplastics, silicone resin, acrylic resin, polyamide resin, polystrene resin, phenolic resin, melamine resin, and polystyrene resin.

When the previously mentioned elastomers, with addition of an electroconductivity-imparting agent thereto, are employed in the electroconductive organic polymeric matrix, it is preferable that the same elastomers be employed as the insulating particles in order to decrease the hardness of the surface layer of the developer-bearing member.

Insulating elastomer particles can be prepared by conventional methods, for example, by freezing an elastomer and pulverizing the frozen elastomer, by merely grinding an elastomer, or by preparing an aqueous emulsion of an elastomer by using a surface active agent and hardening the emulsion.

Silicone rubber is particularly useful as the above-mentioned elastomer from the viewpoints of its low hardness, environmental resistance, and releasability.

The ratio of the amount of the insulating particles to the amount of the electroconductive organic polymeric matrix is preferably 10–200 parts by weight of the insulating particles to 100 parts by weight of the electroconductive organic polymeric matrix.

Furthermore in the developer-bearing member according to the present invention, it is preferable that the total surface area of the charge-retainable insulating segments be in the range of 20 to 80%, more preferably 50 to 80%, of the entire surface of the surface layer of the developer-bearing member.

The developer-bearing member according to the present invention can be prepared as follows:

The previously mentioned insulating particles are dispersed in the material for the electroconductive organic polymeric matrix by use of the conventional methods, such as a dispersing method using a ball mill, and a kneading method, whereby a dispersion is obtained. The thus obtained dispersion is molded into a layer on an electroconductive support, such as a metallic roller made of, for instance, SUS, iron or Al, by injection molding, extrusion molding, spray coating, or dipping.

In the developer-bearing member according to the present invention, it is preferable that the difference in the rubber hardness in accordance with the Japanese Industrial Standards K6301 between the insulating particles and the electroconductive organic polymeric matrix prepared, for instance, from the above-mentioned elastomers, be 20 degrees or less, in order to prepare a smooth surface layer for the developer-bearing member, in particular, when the charge-retainable insulating segments are formed from the insulating particles in the surface. If the surface layer is rough, it is difficult to uniformly charge toner particles triboelectrically, the charge quantity of toner particles cannot be sufficiently increased because some toner particles are trapped in the minute concave portions in the surface layer, and the contact torque between a toner supply member or a latent-electrostatic-image-bearing member and the developer-bearing member is increased.

Furthermore, when the permanent compressive strain of the surface layer of the developer-bearing member in accordance with the Japanese Industrial Standards K6301 is 25% or less, it is easy to hold a large amount of toner particles on the developer-bearing member and to transport the particles by the developer-bearing member, and the vibrations of the developer-bearing member and the latent-electrostatic-image bearing member, which are generated during the contact rotation of the two members, can be minimized, so that the formation of images with uneven image density can also be minimized.

In order to increase the adhesion between the electroconductive organic polymeric matrix and the electroconductive support, a primer can be employed. It is preferable that an electroconductive primer be employed.

The method of developing latent electrostatic images by use of a developer-bearing member according to the present invention will now be explained with reference to the accompanying drawings.

FIG. 1 shows a schematic cross-sectional view of a development unit including a developer-bearing member according to the present invention.

Figure 2:
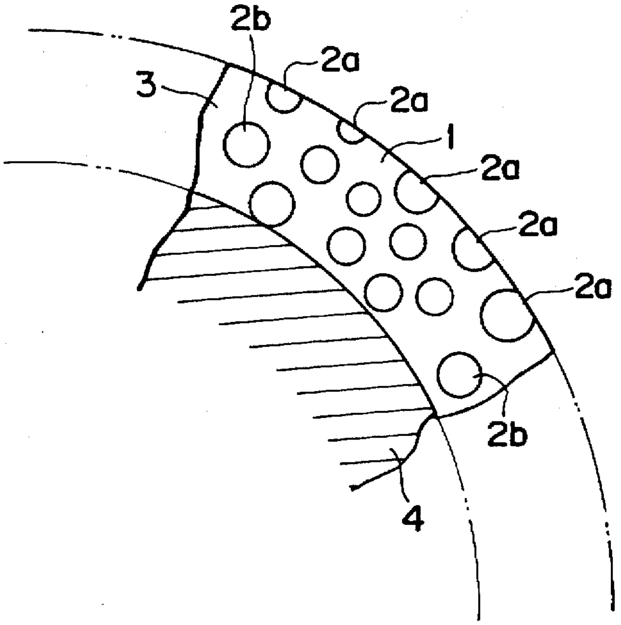
FIG. 2 is a schematic cross-sectional view of the surface portion of the developer-bearing member according to the present invention.

FIG. 2 shows an enlarged schematic cross-sectional view of a developer-bearing member according to the present invention, in which reference numeral 1 represents an electroconductive organic polymeric matrix, reference numeral **2*a* represents charge-retainable insulating segments, which comprise insulating particles 2*b*, reference numeral 3 represents a surface layer, and reference numeral 4** represents an electroconductive support.

In FIG. 1, a toner 60 held in a toner tank 70 is transported onto a toner supply member which is a sponge roller or a fur brush by a stirring member 50 serving as an auxiliary toner supply member.

On the other hand, upon completion of a development step, a developer-bearing member 20 according to the present invention, which is a development roller, is rotated in the direction of the arrow, for instance, at 400 rpm, and comes into contact with the toner supply member 40. The toner supply member 40 is rotated, for instance, at 300 rpm, in the direction opposite to that of the developer-bearing member 20, so that the charge-retainable insulating segments **2*a* in the surface layer 3 of the developer-bearing member 20 are triboelectrically charged. As a result, numerous micro closed electric fields are formed between the surface of the electroconductive organic polymeric matrix 1 and the charge-retainable insulating segments 2*a*. The toner 60 is also triboelectrically charged by the toner supply 40 and deposited on the developer-bearing member 20**.

This toner deposition is basically carried out by the triboelectric charging between the toner 60 and the charge-retainable insulating segments **2*a* of the developer-bearing member 20 and between the toner 60 and the toner supply member 40. The toner 60 and the charge-retainable insulating segments 2*a* of the developer-bearing member 20 are widely separated in terms of the triboelectric series, while the toner supply member 40 is positioned between them in terms of the triboelectric series. Therefore, when the toner supply member 40** is electroconductive, the toner particles are stably charged as follows.

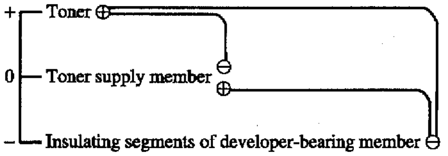

The toner is charged to a positive polarity. The toner is positioned in the concave potions in the toner supply member 40 or on the surface of the toner supply member 40. Under the most appropriate charging conditions, the charge-retainable insulating segments 2a of the developer-bearing member 20 are triboelectrically charged to a negative polarity by the friction between the toner supply member 40 and the insulating segments 2a. The toner is charged to a positive polarity by the friction between the toner and the toner supply member 40. Furthermore, the toner is triboelectrically charged to a positive polarity by the friction between the toner and the insulating segments 2a of the developer-bearing member 20, and the insulating segments 2a are charged to a negative polarity.

When the toner supply member 40, which contributes to both positive charging an negative charging, is electroconductive, the above charging is further stabilized. As a result, a stable charging and a multiple, thin toner deposition can be attained.

Therefore, by selecting each of the members in accordance with the above-mentioned triboelectric series, a development unit which i simple in the structure, but capable of attaining stable triboelectric charging and therefore capable of forming stable micro closed electric fields, and accordingly capable of yielding latent electrostatic images from which high quality toner images can be obtained, can be constructed.

Furthermore, in the present invention, it is preferable that the insulating segments 2a of the developer-bearing member be made of insulating particles having a specific inductive capacity of 4 or less in order to attain stable triboelectric charging.

When two materials are brought into contact with each other and frictioned while in contact, an electric double layer is formed in the interface between the two materials. When the two materials are separated, the electric charges in the electric double layer are also separated and the separated electric charges are retained in each of the two materials, whereby the two materials are triboelectrically charged.

In the present invention, it is important that the intensity of the micro closed electric fields formed near the developer-bearing member 20 is great. However, the intensity of the electric fields largely depends upon the specific inductive capacity of the insulating segments 2a of the developer-bearing member 20. Thus it is preferable that the specific inductive capacity of the insulating segments 4 be 4 or less, in which case, stable triboelectric charging is attained and therefore, micro closed electric fields with high intensity can be formed near the developer-bearing member 20.

The insulating segments 2a can be electrically charged (i) by bringing a triboelectric charging member exclusively used for that purpose into contact therewith prior to the triboelectric charging of the insulating segments 2a by the toner supply member 40, or (ii) by applying electric charges thereto by a corona charge prior to the triboelectric charging by the toner supply member 40.

With reference to FIG. 1, as the developer-bearing member 20 is rotated, the toner 60 deposited on the developer-bearing member 20 is formed into a toner layer with a predetermined thickness by a toner-layer-thickness regulating member 30, which is an elastic blade, and the electric charge of the other 60 is also stabilized. The toner 60 on the developer-bearing member 20 then reaches a development zone 80 where latent electrostatic images formed on a latent-electrostatic-image bearing member 10 are developed to visible toner images by bringing the developer-bearing member 20 near or into contact with the latent-electrostatic-image bearing member 10. When necessary for adjusting the quality of the toner images, a bias voltage, with D.C., A.C., or D.C. superimposed AC, may be applied to the developer-bearing member 20 or the toner supply member 40 through a bias voltage application means 90.

When an elastic layer is employed as the surface layer of the above developer-bearing member 20, the developer-bearing member 20 can be brought into pressure contact with the latent-electrostatic-image bearing member 10 in the development zone 80. In this case, it is preferable that the maximum depression of the surface layer 3 of the developer-bearing member 20 in pressure contact with the latent-electrostatic-image bearing member 10 be not more than 3/10 the thickness of the surface layer in order to avoid the overall deformation of the developer-bearing member 20 and the vibrations generated in the contact of the developer-bearing member 20 with the latent-electrostatic-image bearing member 10.

In order to form micro closed electric fields near the developer-bearing member 20, in addition to the above described method, there is a method, in which the surface layer of the developer-bearing member 20 is made of an elastic insulating rubber, and numerous micro charge patterns are directly applied to the surface layer made of an elastic insulating rubber. The direct application of such micro charge patterns to the surface layer can be carried out, for instance, by bringing an electrode with micro irregularities into contact with the surface layer and applying a voltage thereto through the electrode.

When the developer-bearing member 20 and the latent-electrostatic-image-bearing member 10 are rotated in contact with each other substantially at the same speed, for instance, in the same speed, it is preferable that the surface layer of the developer-bearing member have a permanent compressive strain of 25% or less in accordance with the Japanese Industrial Standards K6301. This is because when such a surface layer is employed, a sufficiently large amount of the toner can be carried by the developer-bearing member 20 and the overall deformation of the developer-bearing member 20 and the vibrations generated in the contact of the developer-bearing member 20 with the latent-electrostatic image bearing member 10 can be minimized.

With respect to a developer for use in the present invention, the co-inventors of the present application proposed a toner suitable for use in the development method using micro closed electric fields in the previously mentioned copending U.S. Application. According to them, a toner with a degree of aggregation of 5 to 60%, and a triboelectric charge quantity of 2 to 30 μC/g on the developer-bearing member 20.

Furthermore, in the present invention, it is preferable that toner particles with a volume means diameter which is not more than 1/3 the average diameter of the minute charge-retainable insulating segments in the surface layer of the developer-bearing member 20. When such toner particles are employed, a thick toner layer can be formed on the surface of the developer-bearing member 20 and therefore high quality toner images can be obtained in a stable manner.

The features of this invention will become apparent in the course of the following description of exemplary embodiments which are given for illustration of the invention and are not intended to be limiting thereof.

EXAMPLE 1

A coating liquid is prepared from the following formulation:

| | Parts by Weight |
|---|---|
| Electroconductive paint (Trademark "Electrodag 440" made by Acheson (Japan), Ltd. Solid components: 70% Ni particles containing acrylic resin) | 100 |
| Acrylic resin (average particle size 80 μm) | 50 |
| Diluent (Trademark "SB-1" made by Acheson (Japan), Ltd.) | 200 |

The above coating liquid was applied to a metallic roller made of SUS by spray coating and dried at 80° C. for 1 hour, whereby a surface layer was formed on the metallic roller. The coated surface layer was ground to form a surface layer with a thickness of 100 μm, whereby a developer-bearing member according to the present invention, which is referred to as a development roller No. 1, was fabricated.

EXAMPLE 2

A mixture of the following components was subjected to ball milling in a ball mill for 72 hours, whereby a carbon black master batch was prepared:

| | Parts by Weight |
|---|---|
| Silicone resin (Trademark "SR-2411" made by Toray Silicone Co., Ltd.) | 100 |
| Ketjen Black EC (Lion Akzo Co., Ltd) | 10 |

A coating liquid is prepared from the following formulation:

| | Parts by Weight |
|---|---|
| Carbon black master batch | 100 |
| Silicone resin (Trademark "SR-2411" made by Toray Silicone Co., Ltd.) | 100 |
| Insulating silicon particles (Trademark "Trefil R-901" made by Toray Dow-Corning Silicone Co., Ltd.) (average particle size: 10 μm) | 50 |
| Toluene | 100 |

The above coating liquid was applied to a metallic roller made of SUS by spray coating and dried at 80° C. for 1 hour, whereby a surface layer was formed on the metallic roller. The coated surface layer was ground to form a surface layer with a thickness of 100 μm, whereby a developer-bearing member according to the present invention, which is referred to as a development roller No. 2, was fabricated.

EXAMPLE 3

A mixture of the following components was kneaded by a two-roller type kneader:

| | Parts by Weight |
|---|---|
| Methylvinyl siloxane raw rubber | 100 |
| Fluorosiloxane raw rubber | 100 |
| Dry silica (Trademark "R-972" made by Nippon Aerosil Co., Ltd.) | 30 |
| Fluorine-based surfactant (Trademark "DS-401" made by Daikin Industries, Ltd.) | 2 |
| Insulating silicon particles (Trademark "E-501" made by Toray Dow-Corning Silicone Co., Ltd.) (average particle size: 10 μm) | 100 |

To 100 parts by weight of the above kneaded mixture, 1.5 parts by weight of a cross linking agent (2,4-dimethyl-2,4-di-tert-butylperoxyhexane: Trademark "RC-4" made by Toray Silicone Co., Ltd.) were added, whereby a compound for molding was prepared.

A metallic roller made of SUS was coated with an electroconductive primer (Trademark "DY39-011" made by Toray Silicone Co., Ltd.).

The above prepared compound was applied to the primer-coated metallic roller and the applied compound was subjected to a first vulcanization under the conditions of 170° C./10 minutes, 120 kgf/cm$^2$, and to a second vulcanization by conducting a press molding under the conditions of 200° C./4 hours, whereby a surface layer was formed.

The surface layer was ground to form a surface layer with a thickness of 100 μm, whereby a developer-bearing member according to the present invention, which is referred to as a development roller No. 3, was fabricated.

EXAMPLE 4

The procedure for Example 3 was repeated except that the insulating silicon particles employed in Example 3 were replaced by insulating silicone rubber particles (Trademark "Trefil E-850" made by Toray Silicone Co., Ltd.), whereby a developer-bearing member according to the present invention, which is referred to as a development roller No. 4, was fabricated.

Each of the development rollers No. 1 and No. 2 which were respectively fabricated in Example 1 and Example 2 was incorporated in the development unit shown in FIG. 1, so that (1) the charge quantity (μC/g) of a positively chargeable one-component type developer which is hereinafter simply referred to as the toner was measured and (2) the toner deposition (mg/cm$^2$) were measured. The results are shown in Table 1.

In the above-mentioned development unit, the toner-layer-thickness regulating member 30 is made of an urethane rubber, and the toner supply member 40 is made of an urethane rubber sponge.

The latent-image-bearing member 10 is an endless-belt-shaped photoconductor comprising an endless-belt-shaped electroconductive support and an organic photoconductive layer formed thereon which comprises an organic charge generating layer and an organic charge transporting layer overlaid in this order. This endless-belt-shaped photoconductor was incorporated in such a manner as to be in contact with the development roller.

TABLE 1

| | Charge Quantity of Toner (μC/g) | Toner Deposition (mg/cm²) |
|---|---|---|
| Example 1 | 10.3 | 0.87 |
| Example 2 | 11.8 | 1.04 |

The results shown in Table 1 indicate that the development rollers No. 1 and No. 2 prepared in Examples 1 and 2 are capable of providing a stable charge quantity of the toner and a stable toner deposition.

Each of the development rollers No. 3 and No. 4 which were respectively fabricated in Example 3 and Example 4 was incorporated in the development unit shown in FIG. 1, so that (1) the charge quantity (μC/g) of a positively chargeable one-component type developer which is hereinafter simply referred to as the toner was measured and (2) the toner deposition (mg/cm$^2$) were measured, provided that the endless-belt-shaped organic photoconductor was replaced by a drum-type organic photoconductor. The results are shown in TABLE 2.

TABLE 2

| | Charge Quantity of Toner (μC/g) | Toner Deposition (mg/cm²) | Rubber Hardness (JISA) |
|---|---|---|---|
| Example 3 | 11.5 | 1.10 | 42 |
| Example 4 | 10.8 | 1.05 | 30 |

The results in TABLE 2 indicate that the development rollers No. 3 and No. 4 fabricated in Examples 3 and 4 are also capable of providing a stable charge quantity of the toner and a stable toner deposition. The above table also shows the rubber hardness of each of the development rollers, measured in accordance with the Japanese Industrial Standards K6301, is also shown.

EXAMPLE 5

The mixture of the following components was kneaded by a two-roller type kneader:

| | Parts by Weight |
|---|---|
| Electroconductive siloxane rubber (Trademark "DY32-700U" made by Toray Silicone Co., Ltd.) | 100 |
| Curing agent (Trademark "RC-4" made by Toray Silicone Co., Ltd.) | 1 |
| Insulating particles* (average particle size: about 100 μm) | 80 |

*The above insulating particles were prepared by freezing a commercially available silicone rubber (Trademark "SE1185u" made by Toray Silicone Co., Ltd.), pulverized and classified to obtain particles with an average particle size of about 100 μm.

A metallic roller made of SUS was coated with an electroconductive primer (Trademark "DY39-011" made by Toray Silicone Co., Ltd.).

The above prepared kneaded mixture was applied to the primer-coated metallic roller and the applied mixture was subjected to a first vulcanization under the conditions of 170° C./10 minutes, 120 kgf/cm$^2$, and to a second vulcanization by conducting a press molding under the conditions of 200° C./4 hours, whereby a surface layer was formed.

The thus formed surface layer was ground, whereby a developer-bearing member according to the present invention, which is referred to as a development roller No. 5, was fabricated.

The permanent compressive strain of the surface layer of the thus prepared development roller No. 5 was measured in accordance with the Japanese Industrial Standards K6301 at room temperature for 72 hours. The result was that the permanent compressive strain was 8%.

The development roller No. 5 was incorporated in the development unit employed in Example 1 and the latent-electrostatic-image bearing member 10 and the development roller No. 5 were rotated in the same direction at the same speed for development of latent electrostatic images. The result was that no uneven image density was observed in the obtained images.

EXAMPLE 6

[Preparation of Insulating Elastomer Particles]

A mixture of 100 parts by weight of a dry-type-silica-containing silicone rubber (Trademark "SE1185u" made by Toray Dow-Corning Silicone Co., Ltd.) and 1 part by weight of ac ross-linking agent (Trademark "RC-4" made by Toray Dow-Corning Silicone Co., Ltd.) was kneaded in a two-roll mill. The thus kneaded mixture was subjected to a first vulcanization under the conditions of 170° C./10 minutes, and to a second vulcanization under the conditions of 200° C./10 hours, whereby a rubber sheet was prepared.

The rubber hardness of this rubber sheet was measured in accordance with the Japanese Industrial Standards K6301. The result was that the rubber hardness was 50 degrees. The volume resistivity of the rubber sheet was also measured under DC 100 V. The result was that the volume resistivity was $3\times10^{15}$ Ω·cm.

This rubber sheet was then frozen by liquid nitrogen, pulverized, and classified so that insulating elastomer particles with an average particle size of about 200 μm were obtained.

[Preparation of Electroconductive Elastomers A, B, C and D]

Electroconductive elastomers A, B, C and D were prepared by mixing the components in the following respective formulations:

| | Parts by Weight |
|---|---|
| Electroconductive elastomer A | |
| [Formulation] | |
| Dimethylsiloxane raw rubber | 100 |
| Dry type silica | 10 |
| Ground quartz | 5 |
| [Properties] | |
| Rubber hardness: 38 degrees | |
| Volume resistivity: $1 \times 10^5$ Ω · cm | |
| Electroconductive elastomer B | |
| [Formulation] | |
| Dimethylsiloxane raw rubber | 100 |
| Dry type silica | 15 |
| Ground quartz | 5 |
| Ketjen black | 13 |

-continued

| | Parts by Weight |
|---|---|
| [Properties] | |
| Rubber hardness: 52 degrees | |
| Volume resistivity: $4 \times 10^5\ \Omega \cdot cm$ | |
| Electroconductive elastomer C | |
| [Formulation] | |
| Dimethylsiloxane raw rubber | 100 |
| Ground quartz | 15 |
| Ketjen black | 8 |
| [Properties] | |
| Rubber hardness: 24 degrees | |
| Volume resistivity: $1 \times 10^5\ \Omega \cdot cm$ | |
| Electroconductive elastomer D | |
| [Formulation] | |
| Dimethylsiloxane raw rubber | 100 |
| Dry type silica | 22 |
| Ground quartz | 20 |
| Ketjen black | 20 |
| [Properties] | |
| Rubber hardness: 76 degrees | |
| Volume resistivity: $5 \times 10^5\ \Omega \cdot cm$ | |

A mixture of 80 parts by weight of the insulating elastomer particles and 100 parts by weight of one of the above prepared electroconductive elastomers A, B, C and D was kneaded in a two-roll mill.

A metallic roller made of SUS was coated with an electroconductive primer (Trademark "DY39-011" made by Toray Silicone Co., Ltd.).

One of the above prepared kneaded mixtures was applied to the primer-coated metallic roller and the applied mixture was subjected to a first vulcanization under the conditions of 170° C./10 minutes, 120 kgf/cm$^2$, and to a second vulcanization by conducting a press molding under the conditions of 200° C./4 hours, whereby a surface layer was formed.

Each of the thus formed surface layers was ground, whereby four developer-bearing members A, B, C, and D were fabricated.

The surface roughness of each of the surface layers was measured by a commercially available tester (Trademark "Hommel Tester T1000 type" made by Hommel Welks Co., Ltd.).

Each of the developer-bearing members A, B, C, and D was incorporated in the development unit as shown in FIG. 1. In the development unit, the toner-layer-thickness regulating member 30 is made of an urethane rubber, the toner supply member 40 is made of an urethane sponge. The employed toner is a positively chargeable toner. The latent-image-bearing member is an organic photoconductive drum comprising an aluminum cylinder serving as an electroconductive support and an organic photoconductive layer comprising an organic charge generating layer and an organic charge transporting layer which are overlaid in this order.

The results are shown in the following TABLE 3.

TABLE 3

| Developer-Bearing Member | Hardness Difference | Surface Roughness (μm) | Bearing Amount (mg/cm$^2$) | Charge Quantity (μC/g) |
|---|---|---|---|---|
| A | 12 | 8.8 | 0.97 | 11.3 |
| B | 2 | 7.6 | 0.95 | 12.0 |
| C | 26 | 25.1 | 1.86 | 3.1 |
| D | 26 | 19.4 | 2.02 | 1.9 |

In the above table, "Bearing Amount" denotes the amount of the toner borne by the developer-bearing member.

The results shown in the above table indicate that the developer-bearing members A and B, in which the difference in the rubber hardness between the insulating elastomer and the electroconductive elastomer is not more than 20 degrees, have a small surface roughness, and the bearing amount is well controlled and the charge quantity of the other is sufficiently large, but the developer-bearing members C and D, in which the difference in the rubber hardness between the insulating elastomer and the electroconductive elastomer is more than 20 degrees, have a large surface roughness, and the bearing amount is not well controlled and the charge quantity of the toner is insufficient.

What is claimed is:

1. A method of developing latent electrostatic images comprising the steps of:

forming numerous micro closed electric fields near the surface of a rotatable developer-bearing member which comprises an electroconductive support and a surface layer formed thereon comprising an electroconductive organic polymeric matrix and numerous minute charge-retainable insulating segments distributed at least one the surface of said surface layer, by electrically charging the surface of said charge-retainable insulating segments, said insulating segments being insulating particles dispersed in said electroconductive organic polymeric matrix and exposed on the surface of said surface layer such that said surface layer is electrically chargeable to form said numerous micro closed electric fields for holding toner particles on said rotatable developer-bearing member, supplying a one-component type developer comprising toner particles to said rotatable developer-bearing member to hold said developer on said rotatable developer-bearing member by said numerous micro closed electric fields; and bringing said rotatable developer-bearing image member near or into contact with a latent-electrostatic-image bearing member which bears latent electrostatic images to develop said latent electrostatic images with said one component developer to visible toner images, wherein the total surface area of said charge-retainable insulating segments is in the range of 20 to 80% of the entire surface area of said surface layer and wherein said charge-retainable insulating segments have a mean diameter of 30 to 500 μm.

2. The method of developing latent electrostatic images as claimed in claim 1, wherein the total surface area of said charge-retainable insulating segments is in the range of 50 to 80% of the entire surface area of said surface layer.

3. The method of developing latent electrostatic images as claimed in claim 1, wherein said electroconductive organic polymeric matrix is elastic.

4. The method of developing latent electrostatic images as claimed in claim 1, wherein said insulating particles which are dispersed in said electroconductive organic polymeric matrix are elastic.

5. The method of developing latent electrostatic images as claimed in claim 1, wherein said toner particles have a volume mean diameter which is not more than ⅓ the average diameter of said minute charge-retainable insulating segments.

6. The method of developing latent electrostatic images as claimed in claim 1, wherein the maximum depression of said surface layer, when said surface layer is brought into contact with said latent-electrostatic-image-bearing member for development latent electrostatic images, is not more than 3/10 the thickness of said surface layer.

7. The method of developing latent electrostatic images as claimed in claim 1, wherein said one-component type developer is charged to a polarity opposite to the polarity of said charged charge-retainable insulating segments.

8. The method of developing latent electrostatic images as claimed in claim 1, wherein said electroconductive organic polymeric matrix has an electric resistivity of $10^{12}$ Ω·cm or less under the conditions of 10° C. and 15%RH.

9. The method of developing latent electrostatic images as claimed in claim 8, wherein said electroconductive organic polymeric matrix has an electric resistivity of $10^{8}$ Ω·cm or less under the conditions of 10° C. and 15%RH.

10. The method of developing latent electrostatic images as claimed in claim 1, wherein said electroconductive organic polymeric matrix has an electric resistivity of $10^{10}$ Ω·cm or less under the conditions of 10° C. and 15%RH, and an electric resistivity of $10^{8}$ Ω·cm to $10^{10}$ Ω·cm under the conditions of 30° C. and 80%RH.

11. The method of developing latent electrostatic images as claimed in claim 1, wherein said insulating particles dispersed in said electroconductive organic polymeric matrix has an electric resistivity of $10^{13}$ Ω·cm or more.

12. The method of developing latent electrostatic images as claimed in claim 1, wherein said charge-retainable insulating segments have a specific inductive capacity of 4 or less.

* * * * *